United States Patent

Baxter et al.

[11] Patent Number: 5,902,358
[45] Date of Patent: May 11, 1999

[54] HIGH STRENGTH, STORAGE STABLE, ANTHRAQUINONE BLUE DYE SOLUTIONS

[75] Inventors: D. Roderick Baxter; P. John Cranmer, both of Mirfield, United Kingdom

[73] Assignee: Morton International, Inc., Chicago, Ill.

[21] Appl. No.: 09/079,544

[22] Filed: May 15, 1998

[51] Int. Cl.$^6$ .................................................... D06P 1/20
[52] U.S. Cl. ................................................. 8/643; 8/602
[58] Field of Search ........................ 8/643, 602; 552/255

[56] References Cited

U.S. PATENT DOCUMENTS

| | | | |
|---|---|---|---|
| 3,164,449 | 1/1965 | Bauxbaum | 44/59 |
| 3,597,254 | 8/1971 | Graser et al. | 106/288 |
| 4,303,407 | 12/1981 | Marangelli et al. | 8/643 |

*Primary Examiner*—Margaret Einsmann
*Attorney, Agent, or Firm*—Wayne E. Nacker; Gerald K. White

[57] ABSTRACT

The present invention provides a dye solution of anthraquinone blue dyes in a non-polar organic solvent, which dyes are a mixture of dyes of the general formulae:

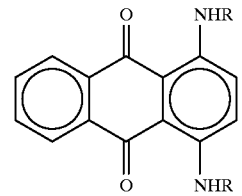

where the Rs on each compound are selected from the group consisting of 2-ethylhexyl, mixed amyl, n-butyl and methyl, and wherein said dye mixture is the reaction product of quinizarin and/or leuco quinizarin and between about 15 and about 35 mole % of each of 2-ethylhexylamine, n-butylamine, amylamine and methylamine. The dye solutions, at high concentrations, are stable at low temperatures. These dye solutions also provide high tinctorial strength.

5 Claims, No Drawings

HIGH STRENGTH, STORAGE STABLE, ANTHRAQUINONE BLUE DYE SOLUTIONS

The present invention is directed to aminoanthraquinone blue colorants, more particularly to anthraquinone dyes solutions which can be highly concentrated and which at high concentrations exhibit stability at low temperatures.

BACKGROUND OF THE INVENTION

U.S. patent application Ser. No. 08/911,889, the teachings of which are incorporated herein by reference, is directed to a method of producing aminoanthraquinone blue colorants. The method set forth therein reacts quinizarin and/or its leuco derivative with a mixture of aliphatic amines, wherein the reaction is carried out in the presence of a glycol and/or a glycol ether. Subsequent to the reaction, excess amine and water are removed, leaving a highly concentrated solution of dyes in the glycol or glycol ether. The solution can be directly diluted with a non-polar aromatic solvent to provide a dye solution of high concentration.

While U.S. patent application Ser. No. 08/911,889 described the production of highly concentrated dye solutions, experience has shown that there is a limit to the concentration of such solutions if they are subject to exposure to low temperatures, e.g., −20° C., during shipping and handling.

There has been a need to have even more highly concentrated dye solutions which are stable at low temperatures, i.e., down to −20° C.

The present invention is directed to a dye solution which is the reaction product of quinizarin and/or leuco-quinizarin and a mixture of four particular amines in specific relative molar ratios, which dyes solution can be highly concentrated, yet stable at low temperatures, e.g., down to −20° C.

SUMMARY OF THE INVENTION

In accordance with the invention there is provided a dye solution which is a mixture of dyes of the general formulae:

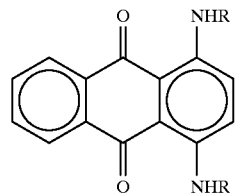

where the Rs on each compound are selected from the group consisting of 2-ethyl hexyl, mixed amyl, n-butyl and methyl, and wherein the dye mixture is the reaction product of quinizarin and/or leuco quinizarin and between about 15 and about 35 mole %, preferably between about 20 and about 30 mole %, of each of 2-ethyl hexyl amine, n-butyl amine, amyl amine, and methylamine. Concentrated solutions, i.e., 40 wt % or more, preferably 50 wt % or more, most preferably 60 wt % or more exhibit excellent low-temperature stability.

DETAILED DESCRIPTION OF CERTAIN PREFERRED EMBODIMENTS

As described in above-referenced U.S. patent application Ser. No. 08/911,889 the reaction which forms aminoanthraquinone dyes is preferably carried out in the presence of a glycol and/or a glycol ether. Preferably, the reaction is carried out in between 2.05 to 2.50 moles of amine per mole of quinizarin. After the reaction is completed, water and excess amine are removed, leaving a homogeneous anthraquinone dye solution. Subsequently, the solution is diluted to its end-use concentration with a non-polar aromatic solvent.

Such non-polar aromatic solvents include, but are not limited to, toluene, xylene, naphthenics, heavy aromatic solvent naphthas, etc.

This particular combination of amines used to form the dyes solutions of the present invention can be used to produce very concentrated solutions; these concentrated solutions are stable at low temperature. Solutions as concentrated as 53 wt % in non-polar aromatic solvents are stable to −20° C. That is, at this temperature, dye does not precipitate and the solution remains a liquid.

The anthraquinone blue dye solutions of the present invention have high tinctorial strength. That is, these dyes have high spectral strength relative to their weight percent in solution. The high tinctorial strength of such dye solutions are important for certain applications.

The invention will now be described in greater detail by way of specific examples.

EXAMPLES 1-8 (1-4 and 6-8 COMPARATIVE)

An anthraquinone dye solution in accordance with the invention (Example 5) was prepared as follows:

A mixture of 33.9 g leuco-quinizarin, 134.5 g quinizarin, 69 g dipropylene glycol monomethyl ether, 48.9 g 2-ethylhexylamine, 32.9 g amylamine, 27.6 g butylamine, and 11.7 g methylamine were gradually heated over about 1 hour to 100° C. and maintained at this temperature for a further 6 hours. The product was cooled to 85° C. and air passed through for 4 hours. Excess amine and water of reaction were removed by vacuum distillation and 265 g of a high flash solvent were added. The product was screened to remove insoluble material.

Comparative Examples 2–4 and 6 were similarly prepared but with different amine ratios. Comparative Example 7 was similarly prepared but with a different amine mixture. Comparative Examples 1 and 8 are made from different amine mixtures. Table 1 below gives the relative molar ratio of amines in the various samples. "Relative strength %" is the relative weight percent relative to Comparative Example 1 (Automate® Blue 8).

TABLE 1

| Example | 1 | 2 | 3 | 4 | 5 | 6 | 7 | 8 |
|---|---|---|---|---|---|---|---|---|
| 2-ethyl-hexylamine | 61.3 | 39.0 | 49.0 | 30.0 | 25.0 | 20.0 | 45.0 | 30.0 |
| amylamine | 26.2 | 32.0 | 27.0 | 30.0 | 25.0 | 20.0 | 45.0 | 25.0 |
| n-butylamine |  | 19.5 | 14.5 | 25.0 | 25.0 | 20.0 |  |  |
| methylamine | 12.5 | 9.5 | 9.5 | 10.0 | 25.0 | 40.0 | 5.0 | 15.0 |
| methoxypropylamine |  |  |  |  |  |  | 5.0 | 30.0 |
| relative strength % | 100 | 100 | 121 | 121 | 121 | 121 | 121 | 121 |
| stability @ ambient | fluid | fluid | fluid | fluid | fluid | fail | slurry | fluid |
| stability @ −10° C. | fluid | poor | solid | poor | fluid | solid |  | fluid |
| stability @ −20° C. | fluid |  |  | lumps | fluid | solid |  | fluid |

Table 2 below compares Example 5 diluted to various weight percentages relative to Example 1 (calculated at 100) and gives spectral strength relative to Example 1 (calculated at 100). Tinctorial gain is calculated by dividing the relative spectral strength by the relative weight percent.

TABLE 2

| Example | 1 | 8 | 5 | 5 | 5 | 5 |
|---|---|---|---|---|---|---|
| dye wt % | 37.6 | 41.5 | 41.8 | 53.0 | 55.4 | 60.9 |
| relative (weight) | 100 | 119.9 | 111.2 | 141.0 | 147.3 | 162.0 |
| relative (spectral) | 100 | 121.6 | 121.6 | 154.1 | 161.0 | 176.9 |
| tinctorial gain | 1.00 | 1.01 | 1.09 | 1.09 | 1.09 | 1.09 |

It can thus be seen that the anthraquinone of the present invention can be provided at high weight strength, is stable in solution at low temperatures down to −20° C., and provides enhanced tinctorial gain relative to related commercial blue dyes.

What is claimed is:

1. A dye solution of anthraquinone blue dyes in a non-polar organic solvent, which dyes are a mixture of dyes of the general formulae:

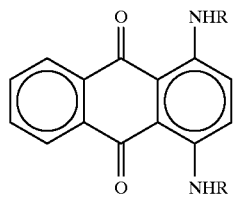

where the Rs on each dye in the mixture are selected from the group consisting of 2-ethyl hexyl, mixed amyl, n-butyl and methyl, and wherein said dye mixture is the reaction product of quinizarin and/or leuco quinizarin and between about 15 and about 35 mole % of each of 2-ethylhexylamine, n-butylamine, amylamine and methylamine.

2. The dye solution according to claim 1 wherein said dye mixture is the reaction product of between about 20 and about 30 mole % of each of said amines with quinizarin and/or leuco quinizarin wherein 2.05 to 2.50 moles of amine is reacted per mole of quinizarin and/or leuco quinizarin.

3. The dye solution according to claim 1 wherein said dye mixture is dissolved in the non-polar organic solvent in an amount of at least about 40 wt %.

4. The dye solution according to claim 1 wherein said dye mixture is dissolved in the non-polar organic solvent in an amount of at least about 50 wt %.

5. The dye solution according to claim 1 wherein said dye mixture is dissolved in the non-polar organic solvent in an amount of at least about 60 wt %.

* * * * *